July 19, 1960 T. G. APOSTOLERIS 2,945,971
DYNAMOELECTRIC MACHINE
Filed May 19, 1958 3 Sheets-Sheet 1

T. G. APOSTOLERIS
INVENTOR.
E. C. McRae
J. R. Faulkner
BY J. H. Oster
K. L. Zerschling
ATTORNEYS July 19, 1960  T. G. APOSTOLERIS  2,945,971
DYNAMOELECTRIC MACHINE
Filed May 19, 1958  3 Sheets-Sheet 2
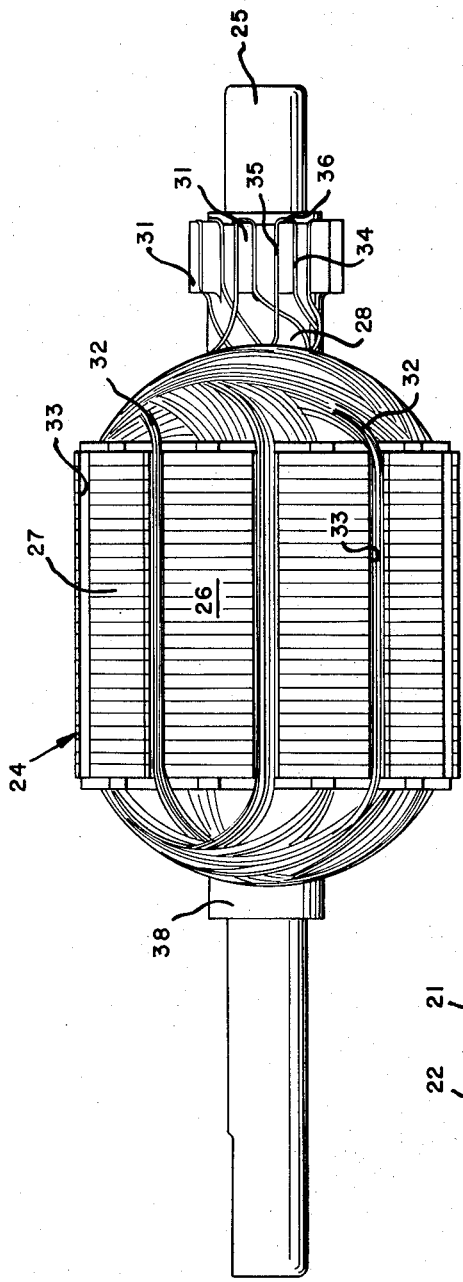
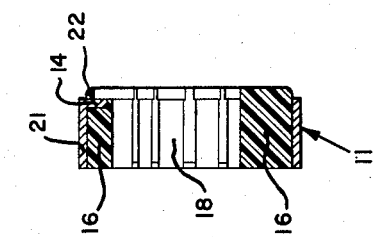
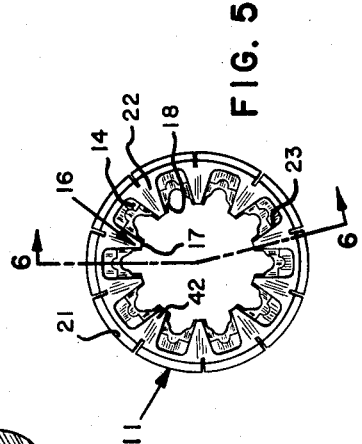
T. G. APOSTOLERIS
INVENTOR.

July 19, 1960

T. G. APOSTOLERIS 2,945,971

DYNAMOELECTRIC MACHINE

Filed May 19, 1958

T. G. APOSTOLERIS
INVENTOR.
BY
ATTORNEYS

United States Patent Office 2,945,971
Patented July 19, 1960

2,945,971
DYNAMOELECTRIC MACHINE

Theodore G. Apostoleris, Ann Arbor, Mich., assignor to Ford Motor Company, Dearborn, Mich., a corporation of Delaware Filed May 19, 1958, Ser. No. 736,102

9 Claims. (Cl. 310—234)

This invention relates to a dynamoelectric machine and more particularly to an improved armature and commutator structure for such a machine and to the method of assembling such an armature and commutator.

In prior dynamoelectric machines, particularly of the fractional horsepower type, the leads from the coils of the armature windings are usually looped over an upstanding tang attached to each of the commutator segments and subsequently the leads are individually soldered to the tangs to provide a connection between the armature coils and the commutator. This procedure is quite time consuming since it requires a number of soldering operations, the number of operations corresponding to the number of commutator segments. Consequently, the cost of manufacturing such a dynamoelectric machine is unduly high, particularly when such individual soldering operations must be performed on a machine which can otherwise be produced by utilizing automation.

In the present invention the need for individually soldering the leads from the armature coils to the commutator segments is obviated. During the winding of the armature core the leads from the armature coils are positioned against a plurality of projections which are supported by the armature shaft. A tubular member having an outer shell of conductive material divided into commutator segments and an inner shell of insulating material having a plurality of slots corresponding to the number of projections is telescopically fitted over the projections and leads. The leads may be exposed at one end of the tubular member in close proximity to the segments of the outer shell of conductive material. The leads may then be electrically connected to the segments by dip soldering or by placing a ring of solder over the leads and the segments of conductive material and melting the solder by means of a torch or inductive heating. Alternatively, the leads may be placed in contact with the segments of the outer shell of conductive material and then electrically connected thereto by hot crimping or pressure welding.

Thus, the armature coil leads may be electrically connected to the commutator segments in one simple operation which is capable of being automated. This eliminates the multiple soldering operation and permits the dynamoelectric machine to be produced in less time than previous machines, with an attendant reduction in cost.

An object of the present invention is the provision of an improved armature and commutator structure for a dynamoelectric machine.

Another object of the invention is the provision of an improved commutator structure for a dynamoelectric machine in which the leads from the armature coils may be electrically connected with the commutator segments in one operation.

A further object of the invention is the provision of an improved commutator structure for a dynamoelectric machine which is inexpensive, simple, and is easily assembled and connected.

Still another object of the invention is an improved method of assembling an armature including a commutator and an improved method of electrically connecting the armature coils to the commutator segments.

Other objects and attendant advantages of the present invention will become more readily apparent as the specification is considered in connection with the accompanying drawings in which:

Figure 5 is a front elevational view of a completed commutator assembly;

Figure 6 is a sectional view taken along the lines 6—6 of Figure 5;

Figure 7 is a perspective view of a completed commutator assembly;

Figure 8 is a perspective view of an armature prior to the placing of the commutator assembly shown in Figures 5 through 7 in place;

Figure 1:
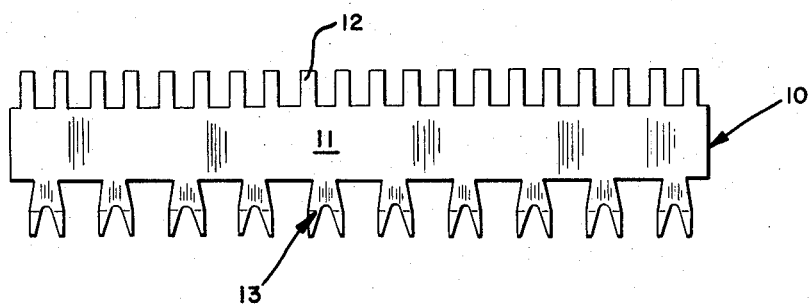
Figure 1 is a plan view of a commutator blank employed in the present invention.
Figure 2:
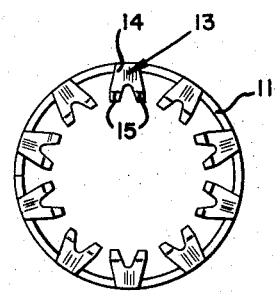
Figure 2 is a front elevational view of the blank after it has been formed into a cylinder.
Figure 3:
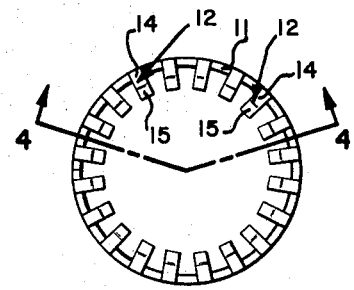
Figure 3 is a rear elevational view of the blank after it has been formed into a cylinder.
Figure 4:
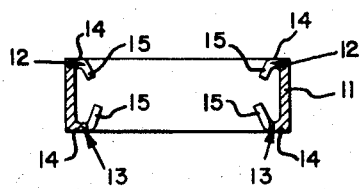
Figure 4 is a sectional view along the lines 4—4 of Figure 3.
Figure 9:
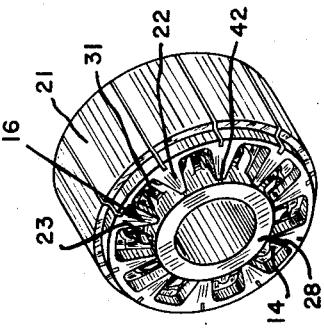
Figure 9 is a perspective view of the completed armature assembly telescopically fitted over a sleeve which is adapted to be mounted upon an armature shaft.
Figure 11:
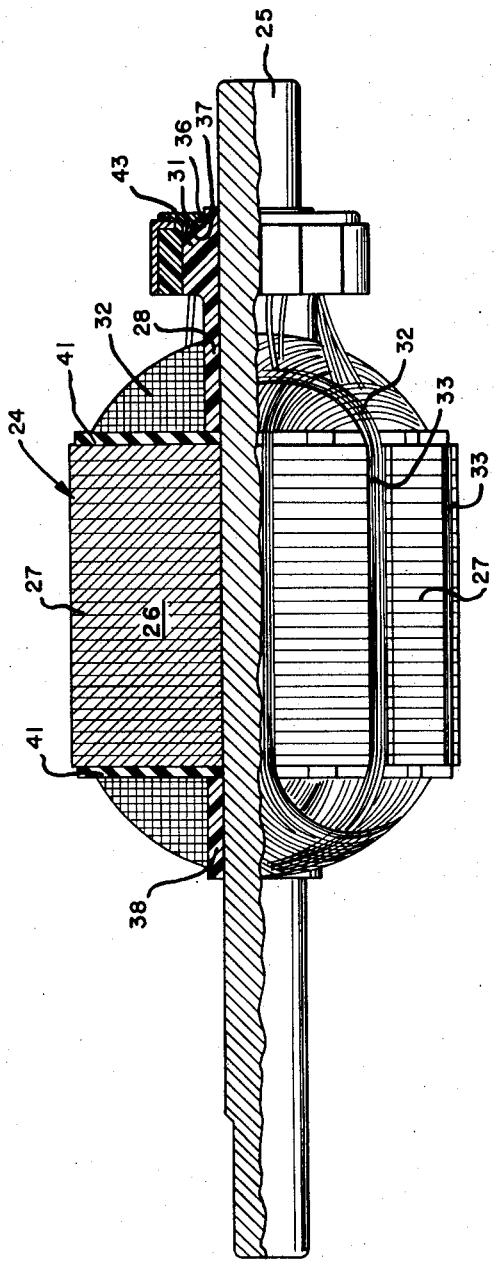

Referring now to the drawings in which like reference numerals designate like parts throughout the several views thereof, there is shown in Figure 1 a flat blank 10 of electrical conductive material having a rectangular portion 11 with a series of bars or tongues 12 preferably of rectangular configuration extending from one edge thereof and a series of bifurcated bars or tongues 13 extending from the opposite edge thereof. This blank may be conveniently formed from a rectangular sheet of copper by cutting or stamping and may then be rolled into a cylinder with the tongues or bars 12 and 13 bent radially inwardly as shown in Figures 2 through 4. A portion of each of the tongues or bars is then further deformed by bending them inwardly toward a plane perpendicular to the rolled portion 11 and passing through the center of structure in an axial direction. Thus, each of the tongues or bars has a flat surface 14 perpendicular to the plane of the portion 11 and a hooked portion 15 positioned at an angle to the flat surfaces 14.

An insulating material, preferably a phenolic molding compound, is then molded into the cylindrical structure shown in Figures 2 through 4 with the hooked portions 15 of the tongues or bars 12 and 13 serving as anchors. The insulating material designated by the numeral 16 is formed with a central bore 17 and a series of slots 18 positioned around the inner circumference of the bore. (See Figures 5 through 7.) Thus, the tubular commutator member has an outer conductive shell formed from the rectangular portion 11 of the blank 10 and an inner shell of insulating material. The outer shell 11 is then cut into a plurality of commutator segments designated by the numeral 21. An inspection of Figures 5 through 7 will reveal that the inner shell of insulating material extends axially beyond that end of the outer shell which has the tongues 13 thus forming an annular ridge 22. This annular ridge is recessed immediately adjacent each slot 18 to expose the flat surfaces 14 of the tongues 13 thereby forming a plurality of solder wells 23.

Referring now to Figures 8 through 11 there is shown an armature generally designated by the numeral 24 having a shaft 25, an armature core 26 composed of a plurality of laminations 27 mounted on the shaft, and a sleeve 28 of insulating material having a plurality of radial projections 31 extending for a substantial distance axially along the sleeve also mounted on the shaft adjacent one end thereof. A series of insulated armature coils 32 are wound upon the core 26 in suitable slots 33. The coils have leads 34 and 35, which may form a loop 36, extending therefrom with the leads positioned against the radial projections 31. The radial projections may be suitably undercut at one end thereof as shown at 37 in Figure 11 to securely retain the loops 36. The coils are suitably insulated from the shaft 25 and the core 26 by means of the sleeve 28, by means of a second sleeve 38 positioned over the other end of the shaft, by means of a spider shaped insulating element positioned at each end of the core and having a plurality of radially extending legs as shown at 41, and a plurality of insulating inserts positioned in slots 33 under the coils.

The armature, as shown in Figure 8, may be wound on an automatic winding machine which form the loops 36 from the leads 34 and 35 with the loops automatically thrown over the radial projections 31 of the sleeve 28 and into the undercut portion 37. At this time, a pair of fingers positioned each of the loops against the radial projections 31 and the body of the sleeve 28. The armature may also be wound on a winding machine in which the leads 34 and 35 are left open ended, so that the loops 36 as described are not present. Such machines usually form the leads from the coils in loops and then cut the ends of the loops to leave the leads open ended. If the leads 34 and 35 are left open ended, they may be positioned against the projections 31 and forced into the undercut portion 37 which can be suitably enlarged to receive the leads. After the armature has been completely wound as shown in Figure 8, the tubular commutator assembly shown in Figures 5 through 7 is telescopically fitted over the sleeve 28, the radial projections 31, the leads 34 and 35, and the loops 36, if present, with the radial projections and leads being positioned within the slots 18. The main body of the sleeve 28 and inner bore 17 in the inner shell of the tubular commutator assembly are dimensioned so that the projections 42 located between the slots 18, shown in Figures 9 and 10 engage the sleeve in a press fit.

Figure 10:
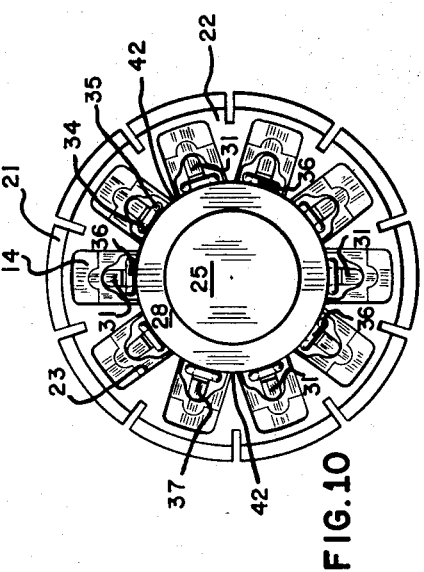
Figure 10 is a front elevational view of the armature after the commutator assembly has been placed in position on the structure shown in Figure 8; and, Figure 11 is a partial longitudinal view of a completed armature assembly constructed in accordance with the invention.

The ends of the leads 34 and 35, or loops 36, may be stripped by an approved stripping procedure, or the insulation employed in insulating the coils and the leads may be of the type that melts away with the application of hot solder. It can be seen by reference to Figure 10 that the ends of the leads 34 and 35 and the loop 36 fit into the recesses or solder wells 23 in close proximity to the exposed surfaces 14 of the commutator segments. The solder wells can most easily be seen by reference to Figures 7 and 9 through 11. The insulating material 16 forms three walls of the solder well with the fourth wall consisting of a portion of the sleeve 28. The bottom of the well comprises the exposed portion 14 of each of the commutator segments, a portion of the insulating material 16, and the projections 31 on the sleeve 28. The exposed surfaces 14 and the ends of the leads 34 and 35 or loops 36 are then electrically connected by filling the recesses or solder wells 23 with solder as shown at 43 in Figure 9. The soldering may be conveniently accomplished by dipping the end of the assembly as shown in Figure 10 in a suitable solder bath. Alternately a ring of solder may be placed over the recesses or solder wells 23 and then melted by a torch or induction heating.

The armature is completed when the soldering process is finished and each of the coils in the armature winding is connected to its respective commutator segment through the leads 34 and 35, or loops 36 if present, the solder 43, and the radially inwardly extending portion 14 of the tongues 13 which are integrally formed with each commutator segment 21.

Alternatively, the leads 34 and 35, or the loops 36, may be made of such length that they can be positioned directly against the radially inwardly extending portions 14 of the tongues 13. The leads or loops may then be electrically connected to the portions 14 which are formed integrally with the commutator segments 21 as by hot crimping or hot pressure welding thereby causing the material of the leads or loops to flow into the material of the portion 14 so that the leads or loops are electrically connected to the commutator segments.

Thus, the present invention provides an armature for a dynamoelectric machine which may be readily assembled by automatic methods. Also, the commutator segments of the armature may be readily connected to the coils of the windings by a one step operation which results in a substantial reduction in cost of the armature over armatures of conventional construction.

It will be understood that the invention is not to be limited to the exact construction shown and described and that various changes and modifications may be made without departing from the spirit and scope of the invention, as defined in the appended claims.

What is claimed is:

1. An armature for a dynamoelectric machine comprising a shaft, an armature core mounted upon said shaft, a plurality of armature coils wound upon said core, said coils having loops extending therefrom, a sleeve having a plurality of electrically insulating radial projections extending therefrom mounted upon said shaft adjacent one end of said armature core, said loops being positioned around said radial projections, a commutator having a plurality of segments and a plurality of slots telescopically fitted over said sleeve, with the slots of the commutator receiving the radial projections on said sleeve and the loops of said coils, said loops being electrically connected to said commutator segments.

2. In an armature for a dynamoelectric machine, a shaft, an armature core mounted upon said shaft, armature coils wound upon said core, said coils having leads extending therefrom, means supported by said shaft for engaging said leads, a commutator assembly comprising an outer shell divided into commutator segments and an inner shell of insulating material, said segments having tongues projecting radially inwardly, said inner shell having a plurality of slots positioned therein adjacent said tongues, said commutator assembly being telescopically fitted over said leads and said means supported by said shaft, with said leads and said means supported by said shaft positioned in said slots, a portion of said leads being positioned adjacent said tongues whereby said leads may be electrically connected to said tongues by means of a single application of solder.

3. In an armature for a dynamoelectric machine, a shaft, an armature core mounted upon said shaft, armature coils positioned upon said core, said coils having leads extending therefrom, insulating means positioned upon said shaft, a tubular member having an outer conductive shell divided into segments and an inner shell of insulating material telescopically fitted over said insulating means, the leads from the armature coils positioned between said insulating means and said inner shell of insulating material, said inner shell of insulating material having recesses positioned therein to expose the segments of said outer shell, said leads from the armature coils extending into said recesses, said leads being electrically connected to said segments.

4. In an armature for a dynamoelectric machine, a shaft, an armature core mounted upon said shaft, armature coils positioned upon said core, said coils having leads extending therefrom, insulating means positioned upon said shaft, a tubular member having an outer conductive shell divided into segments and an inner shell of insulating material telescopically fitted over said insulating means, the leads from the armature coils positioned between said insulating means and said inner shell of insulating material, said inner shell of insulating material having recesses positioned therein to expose the segments of said outer shell, said leads from the armature coils extending into said recesses, and electrical conductive means positioned in said recesses to electrically connect said leads and said segments.

5. A commutator structure comprising a sleeve, a tubular member having an outer shell of conductive material divided into segments and an inner shell of insulating material telescopically fitted over said sleeve, leads from armature coils positioned between said sleeve and said inner shell of insulating material, said inner shell of insulating material having recesses positioned therein to expose the segments of said outer shell, said leads from said armature coils extending through said commutator structure into said recesses, said leads being electrically connected to said segments.

6. A commutator structure comprising a sleeve, a tubular member having an outer shell of conductive material divided into segments and an inner shell of insulating material telescopically fitted over said sleeve, leads from armature coils positioned between said sleeve and said inner shell of insulating material, said inner shell of insulating material having recesses positioned therein to expose the segments of said outer shell, said leads from said armature coils extending through said commutator structure into said recesses, and electrical conductive material positioned in said recesses to electrically connect said leads to said segments.

7. A commutator structure comprising a sleeve having a plurality of projections extending therefrom, leads from armature coils positioned on said sleeve, said leads being positioned against said projections, a tubular member having an outer shell of conductive material divided into a plurality of segments and an inner shell of insulating material having a plurality of slots positioned therein around the inner circumference thereof, said tubular member telescopically fitting over said sleeve, with said projections and leads being positioned in the slots in said inner shell of said tubular member, said leads being exposed at one end of said tubular member, and means for electrically connecting said leads to the segments of the outer shell of conductive material.

8. A commutator structure comprising a sleeve adapted to be fitted over an armature shaft, said sleeve having a plurality of radial projections extending for a substantial distance along the length thereof, leads from armature coils in the form of loops, each radial projection having a loop positioned therearound, a tubular member comprising an outer shell of conductive material divided into segments and an inner shell of insulative material having a plurality of slots positioned around the inner periphery thereof, said inner sheel of insulating material extending beyond an end of said outer shell to form an annular ridge of insulating material, said annular ridge having a plurality of recessed portions positioned therein adjacent each of said slots to expose a portion of each of said segments, said tubular member being telescopically fitted over said sleeve with a radial projection on said sleeve and the loop of said lead positioned therearound being positioned in each of said slots, a portion of each of said loops being positioned in one of said recesses in close proximity to one of said segments, and electrical conductive material positioned in each of said recesses for electrically connecting said loops and said segments.

9. The method of constructing an armature for a dynamoelectric machine comprising the steps of winding armature coils over an armature core mounted upon an armature shaft, placing loops from said coils over projections extending radially from a sleeve positioned upon the armature shaft, said projections having a substantial length in the axial direction of said sleeve, positioning said loops against said projections and the body of said sleeve for substantially the entire length of said projections, telescopically fitting a tubular member having an outer shell of commutator segments and a plurality of slots positioned around the inner circumference thereof, with the number of commutator segments and slots corresponding to the number of radially extending projections and loops over said radially extending projections and said loops, and electrically connecting each of said loops to the corresponding commutator segments simultaneously.

References Cited in the file of this patent

UNITED STATES PATENTS

| | | |
|---|---|---|
| 1,793,986 | Apple | Feb. 24, 1931 |
| 2,316,651 | Moeller | Apr. 13, 1943 |